United States Patent [19]

Hall

[11] Patent Number: 4,582,355

[45] Date of Patent: Apr. 15, 1986

[54] RETRACTABLE WEATHER GUARD FOR CHILD STROLLER OR CARRIAGE VEHICLE

[75] Inventor: David Hall, Dollard des Ormeaux, Canada

[73] Assignee: Dorel Co. Ltd., Quebec, Canada

[21] Appl. No.: 724,571

[22] Filed: Apr. 18, 1985

[51] Int. Cl.⁴ .............................................. B60J 9/00
[52] U.S. Cl. .................................................. 296/78 A
[58] Field of Search .................. 296/102, 78 A, 78 R; 2/84; 280/647–650

[56] References Cited

U.S. PATENT DOCUMENTS

| | | | |
|---|---|---|---|
| 2,546,843 | 3/1951 | Zigterman | 296/78 A |
| 3,330,575 | 7/1967 | Boudreau | 280/648 |
| 3,389,407 | 6/1968 | Morrison | 2/84 |

FOREIGN PATENT DOCUMENTS 211578 2/1924 United Kingdom ............. 296/78 A

Primary Examiner—Robert R. Song

Attorney, Agent, or Firm—Burns, Doane, Swecker & Mathis

[57] ABSTRACT

A retractable weather guard for a child stroller or carriage vehicle. The vehicle has a child support structure having an open top end and attached to a frame supported on wheels. Handles are secured to the frame to permit a person to displace the vehicle on the wheels. A canopy is disposed over a portion of the open top end. The improvement comprises a cover member of flexible material and having an attaching edge portion secured to an underside portion of the canopy so that the cover member can be positioned substantially over an open top end depending from the canopy to shield the open portion of the support structure while permitting sufficient air ventilation to the support structure. The cover member is foldable upon itself and is storable in a pouch provided under the canopy, which pouch has a mouth opening for receiving the cover member and a fastener maintains the mouth opening closed when the canopy is not in use.

6 Claims, 6 Drawing Figures

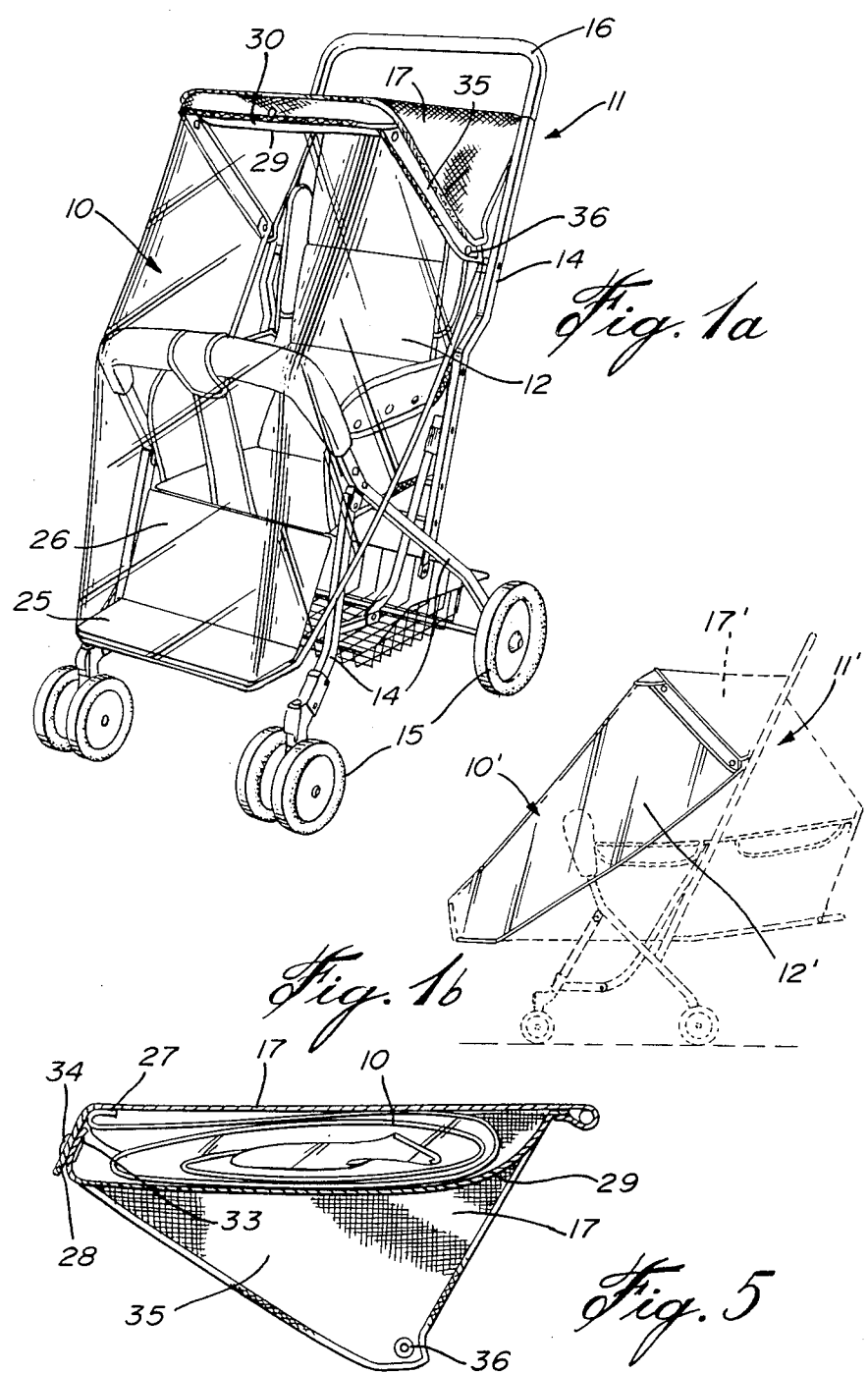

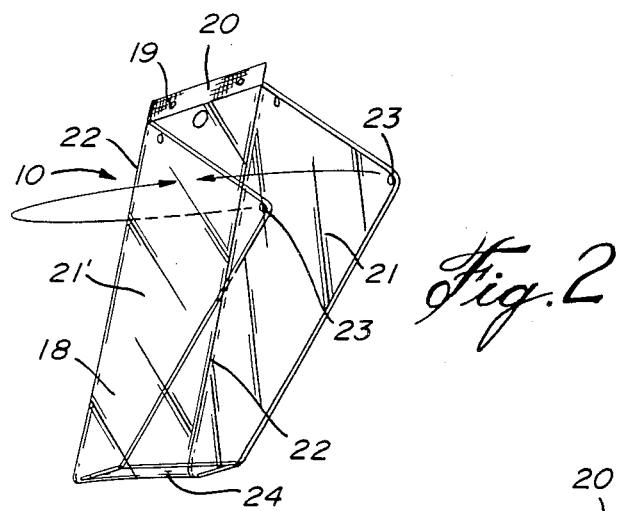
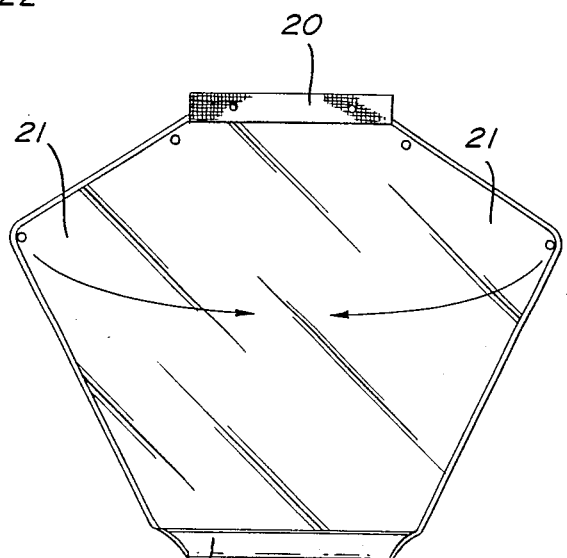
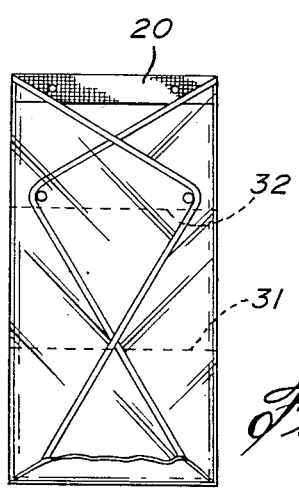

RETRACTABLE WEATHER GUARD FOR CHILD STROLLER OR CARRIAGE VEHICLE

BACKGROUND OF INVENTION (a) Field of the Invention

The present invention relates to a retractable weather guard for use with a child stroller or carriage vehicle and wherein the weather guard is a cover member of flexible material which is secured to the canopy and storable thereunder.

(b) Description of Prior Art

It is known to provide impermeable cover sheets to shield a portion of an open top end of a carriage and wherein the cover member may be attached to the carriage by fasteners and stored within the carriage when not in use. The disadvantage of such weather protecting sheets is that they do not adequately shield the entire open top end of the carriage and the child is often exposed to rain or other climatic conditions such as snow or sun where it is desired to completely shield the infant therefrom. Another disadvantage of such sheet is that it often becomes lost and obstructs the bedding surface on which a child is lying, when stored thereunder, making it uncomfortable for the child. A further disadvantage of such weather protecting sheet is that it is time consuming to install and often in a sudden rain storm there is no time to install the sheet, as by the time a person locates the sheet and installs it, the child is already wet.

There is another need and that is to provide weather protecting sheets for stroller-type vehicles and wherein the sheet may also be used as a weather guard when the stroller vehicle is converted into a carriage.

SUMMARY OF INVENTION

It is a feature of the present invention to provide a retractable weather guard for a child stroller or a carriage vehicle that substantially overcomes all of the disadvantages of the abovementioned prior art.

According to the above feature, from a broad aspect, the present invention provides a cover member to shield an open top end portion of a child support structure, such as a stroller or a carriage vehicle. The cover member comprises a sheet of flexible material having a front panel area with fastening means in a top edge thereof. Opposed side panel areas are also provided and having fastening means in a top attaching edge thereof. The attaching edges are secured to fastening means of the respective ones in the front end side skirts of a canopy provided on the stroller or a carriage.

According to a further broad aspect of the present invention, there is provided a retractable weather guard for a child stroller or a carriage vehicle. The vehicle has a child support structure having an open top end and attached to a frame supported on wheels. Handle means is secured to the frame to displace the vehicle on the wheels. A canopy is disposed over a portion of the open top end of the child support structure. The improvement comprises a cover member of flexible material and having securable means for attaching same to an underside portion of the canopy so that the cover member can be positioned substantially over the remaining open portion of the open top end and depends from the canopy to shield the remaining open portion of the support structure while permitting sufficient air ventilation to the support structure. The cover member is storable in retaining means provided under the canopy.

BRIEF DESCRIPTION OF DRAWINGS

The preferred embodiment of the present invention will now be described with reference to the examples thereof as illustrated in the accompanying drawings, in which:

FIG. 1A is a perspective view of a child stroller having the retractable weather guard of the present invention;

FIG. 1B is a side view of a child carriage having the retractable weather guard of the present invention;

FIG. 2 is a perspective view of the flexible cover member constituting the retractable weather guard of the present invention;

FIG. 3 is a front view of the flexible cover member showing one form of construction thereof;

FIG. 4 is also a front view showing the cover member in a semi-folded condition; and FIG. 5 is a fragmented cross-section view through the canopy showing the flexible cover member in its storage position under the canopy of a stroller or carriage.

DESCRIPTION OF PREFERRED EMBODIMENTS

Referring to the drawings and more particularly to FIG. 1A, there is shown generally at 10, the retractable weather guard as secured to a stroller vehicle 11. The vehicle has a child support structure 12 having an open top end 13 with the support structure being secured to a frame 14 supported on wheels 15. A handlebar 16 is secured to the frame 14 for a person to displace the vehicle 11 on the wheels.

A canopy 17 is secured to the frame 14 and extends over a portion of the open top end 13 whereby to partially shield an infant sitting on the support structure 12 from the rays of the sun, rain, snow, etc. However, as can be seen, such canopy does not cover the entire open top end 13 of the support structure 12 and does not provide adequate protection to an infant against rain, snow, sun, and other severe climatic conditions.

As shown in FIG. 1B, the retractable weather guard 10' may also be secured to a canopy 17' of a carriage-type vehicle 11' and extends over the child support structre 12' thereof. In fact, the stroller 11, as shown in FIG. 1A, is convertible into a carriage, similar to that as shown in FIG. 1B, and the weather guard or cover member 10 also protects the open top end of the child support structure when the stroller is converted into a carriage vehicle. As illustrated in FIG. 1A the cover member is secured to an underside portion of the canopy 17 and depends therefrom to substantially cover the remaining open portion of the open top end while permitting sufficient air ventilation to the support structure from the sides and bottom thereof under the loose cover member. When the cover member is not required, it is folded upon itself and stored by retaining means under the canopy as will be described later.

Referring now to FIGS. 2 to 5, there is shown the construction of the cover member 10 and it consists of a sheet of impervious flexible clear plastic material which is preferably stretchable, although not exclusively, and defines a frontal panel area 18 with fastening means, such as snap fasteners 19 provided in a top attaching edge 20 thereof. The cover member also has opposed side panel areas 21 and 21' formed integral with the frontal panel area 18 or attached thereto by a seam edge strip 22. The side panel areas may also have vent holes to provide additional ventilation for the child seated in the support structure 12. Snap fasteners are also provided in a rear end portion of a top attaching edge thereof. A transverse inwardly extending attaching panel area 24, of substantially rectangular configuration, is provided at the bottom of the front panel area 18 whereby to extend over the foot plate 25 provided at the bottom of the leg support plate 26 which is secured to the frame 14 of the stroller shown in FIG. 1A. The attaching panel 24 may also attach over or depend over the end portion of a carriage support structure as shown in FIG. 1B. The size of the sheet is calculated so that the cover member is taut from the canopy to the foot plate.

As shown in the embodiments of FIGS. 1A and 5, the top attaching edge 20 of the cover member 10 is secured to the top wall of the canopy 17 by a stitch seam 27 disposed in close proximity to the frontal skirt 28 depending from the canopy 17. As also shown in FIG. 5, a pouch 29 of rectangular shape is formed under the canopy 17 and has a frontal mouth opening 30 through which the cover member 10 or at least the front panel 18 thereof extends when the cover member is in its position of use, as shown in FIG. 1A. When the cover member is not in use, it is folded upon itself in the manner such as shown in FIGS. 3 to 5, and stored within the pouch 29. The storage position of the cover member is illustrated in FIG. 5.

Preferably, but not exclusively, the weather guard or cover member is folded in the manner as illustrated in FIGS. 3 and 4 and wherein, firstly, the lower attaching panel 24 is folded frontwardly with the two side panels 21 folded upon itself onto the front panel, as shown in FIG. 4, to form a rectangular folded sheet which is then folded upon itself along the fold lines 31 and 32 with the folded cover then placed within the pouch through the mouth opening 20. A fastener member, such as a male snap fastener 33, is attached to the fabric of the pouch adjacent the mouth opening 30 and in alignment with a female fastener 34 provided in the frontal skirt 28 of the canopy. Thus, the cover member may be stored under the canopy in a neat folded package which is easily retracted by simply undoing one fastener and pulling the sheet out which will unfold quickly over the open top end of the child support structure 12. Thus, there is provided a means of quickly positioning a weather guard cover member to substantially shield the child support structure.

As shown in FIGS. 1A and 5, the canopy is also provided with side skirt portions 35 with fasteners 36 in a corner portion thereof whereby to secure the fasteners 23 of the side panels thereto. Although the fastener members herein shown are snap fasteners, it is conceived that these fasteners may be replaced by "Velcro", registered trade mark, fasteners. It is also conceived that "Velcro" fasteners may be provided with an adhesive back and these could be glued to the frame or child support structure whereby to constitute an attachment means to maintain the cover member in proper position over the open top end of the child support structure. It is further conceived that the cover member need not be of identical shape as that shown in FIGS. 2, 3 and 4, and this shape may vary depending on the shape of the stroller or carriage vehicle onto which the cover member is adapted to. Also, the bottom attaching panel 24 may be done away with or may be replaced by "Velcro" or snap fasteners in the bottom edge of the frontal panel which would attach to a like fastener member which may be secured to the footrest 25 of the stroller, as shown in FIG. 1A. Also, the impervious plastic material forming the cover member may be tinted to diffuse the rays of the sun or may be provided with different colors or designs. Still further, the side panels may be provided with non-transparent impervious fabric material and the front panel of clear plastic material. Other imaginable combinations of colors or fabrics may also be used.

It is within the ambit of the present invention to cover any obvious modifications of the preferred embodiment described herein, provided such modifications fall within the scope of the appended claims.

I claim:

1. A retractable weather guard for a child stroller or carriage vehicle, said vehicle having a child support structure having an open top end and attached to a frame supported on wheels, handle means secured to said frame to displace said vehicle on said wheels, and a canopy disposed over a portion of said open top end, the improvement comprising a cover member of flexible material and having securable means for attaching same to an underside portion of said canopy so that said cover member can be positioned substantially over a remaining open portion of said open top end and depending from said canopy shield said remaining open portion of said support structure while permitting sufficient air ventilation to said support structure, said cover member being storable in a pouch formed under said canopy, said pouch having a mouth opening under a frontal portion of said canopy, said cover member being foldable upon itself and stored in said pouch.

2. A weather guard as claimed in claim 1 wherein said securable means is constituted by two or more fasteners to attach an attaching edge of said cover member under a forward end portion of said canopy.

3. A weather guard as claimed in claim 1 wherein said securable means is a stitch seam interconnecting an attaching edge of said cover member to a forward end portion of said canopy.

4. A weather guard is claimed in claim 1 wherein said canopy is provided with a frontal skirt having fastening means therein, said pouch also having a complementary fastening means in close proximity to said mouth opening to interconnect with said fastening means in said skirt to retain said mouth opening closed and to maintain said pouch concealed under said canopy.

5. A weather guard as claimed in claim 4 wherein side skirts are also provided on the side portions of said canopy, said side skirts having fastener means in a rear end portion thereof remote from said front skirt, said cover member having a front panel area and opposed side panel areas, said front panel area having a top attaching edge for securement under a forward end portion of said canopy behind said frontal skirt, each said opposed side panel areas having a top edge with a fastener means therein for securement to said fastener means of a respective one of said side skirts.

6. A weather guard as claimed in claim 5 wherein said vehicle is a stroller vehicle having a leg support plate depending from a forward end of said open top end, said leg support plate having a bottom foot plate, said cover member having a transverse inwardly extending lower attaching panel configured to receive said foot plate to retain said cover member taut between said canopy and said foot plate.

* * * * *